United States Patent [19]

Friedman et al.

[11] Patent Number: 5,010,953
[45] Date of Patent: Apr. 30, 1991

[54] SAND CONSOLIDATION METHODS

[75] Inventors: Robert H. Friedman; Billy W. Surles, both of Houston, Tex.

[73] Assignee: Texaco Inc., White Plains, N.Y.

[21] Appl. No.: 459,609

[22] Filed: Jan. 2, 1990

[51] Int. Cl.$^5$ ...................... E21B 33/138; E21B 43/24
[52] U.S. Cl. .................... 166/288; 166/295; 166/300; 523/131
[58] Field of Search ............... 166/276, 288, 294, 295, 166/300, 272, 303; 523/131

[56] References Cited

U.S. PATENT DOCUMENTS

| | | | |
|---|---|---|---|
| 3,126,959 | 3/1964 | Ortloff | 166/295 X |
| 4,070,865 | 1/1978 | McLaughlin | 166/295 X |
| 4,328,864 | 5/1982 | Friedman | 166/295 X |
| 4,402,633 | 9/1983 | Self | 166/295 X |
| 4,817,721 | 4/1989 | Pober | 166/295 |
| 4,842,072 | 6/1989 | Friedman et al. | 166/300 X |
| 4,903,770 | 2/1990 | Friedman et al. | 166/295 X |

*Primary Examiner*—George A. Suchfield
*Attorney, Agent, or Firm*—Jack H. Park; Kenneth R. Priem

[57] ABSTRACT

Methods are provided for selectively consolidating naturally occurring mineral grains such as sand grains within a subterranean formation to form a fluid permeable barrier, which restrains the movement of sand particles when oil passes through the barrier. A sand consolidation fluid usually containing a monomer or oligomer of furfuryl alcohol is injected, either mixed with steam to form a multiphase treating fluid or injected as a liquid phase into the formation. The fluid contains an acid catalyst and an ester and an effective amount of a swelling polymer to reduce shrinkage of the furfuryl alcohol when it polymerizes in the formation. A preferred swelling polymer is a copolymer of starch and an acrylamides or acrylates.

8 Claims, No Drawings

SAND CONSOLIDATION METHODS

CROSS REFERENCE TO COPENDING APPLICATIONS

This application is related to copending application Serial No. 07/425,137, now U.S. Pat. No. 4,938,287, filed Oct. 23, 1989 for "SAND CONSOLIDATION METHODS" and to copending application Ser. No. 07/459,608 for Treating Underground Formations filed on Jan. 2, 1990.

FIELD OF THE INVENTION

This invention concerns methods for treating wells completed in subterranean formations containing unconsolidated particulate matter, e.g. unconsolidated sand, which methods bind the unconsolidated sand grains together in the portions of the formation immediately adjacent to the perforations of the well, in order to form a stable, fluid permeable barrier around the wellbore, which permits production of fluids from the formation while restraining the movement of sand into the wellbore during fluid production. More particularly, this invention pertains to a method employing a polymerizable monomer or oligomer, an acid catalyst, an ester and as an additive to reduce shrinkage, a polymer which swells on contact with water.

BACKGROUND OF THE INVENTION

Sand consolidation is a well known term applying to procedures routinely practiced in the commercial production of petroleum, whereby wells are treated in order to reduce a problem generally referred to as unconsolidated sand production. When wells are completed in petroleum-containing formations which also contain unconsolidated granular mineral material such as sand or gravel, production of fluids from the formation causes the flow of the particulate matter into the wellbore, which often leads to any of several difficult and expensive problems. Sometimes a well is said to "sand up", meaning the lower portion of the production well becomes filled with sand, after which further production of fluid from the formation becomes difficult or impossible. In other instances, sand production along with the fluid results in passage of granular mineral material into the pump and associated hardware of the producing well, which causes accelerated wear of the mechanical components of the producing oil well. Sustained production of sand sometimes forms a cavity in the formation which collapses and destroys the well. All of these problems are known to exist and many methods have been disclosed in the prior art and applied in oil fields in order to reduce or eliminate production of unconsolidated sand from a petroleum formation during the course of oil production.

The above-described problem and potential solutions to the problem have been the subject of extensive research by the petroleum industry in the hope of developing techniques which minimize or eliminate the movement of sand particles into the producing well and associated equipment during the course of producing fluids from the formation. One such general approach suggested in the prior art involves treating the porous, unconsolidated sand mass around the wellbore in order to cement the loose sand grains together, thereby forming a permeable consolidated sand mass which will allow production of fluids but which will restrain the movement of sand particles into the wellbore. The objective of such procedures is to create a permeable barrier or sieve adjacent to the perforations or other openings in the well casing which establish communication between the production formation and the production tubing, which restrains the flow of loose particulate mineral matter such as sand. Another approach involves removing a portion of the formation around the well and packing specially prepared resin-coated granular material into the formation around the wellbore which is subsequently caused to become cemented together.

It is a primary objective of any operable sand consolidation method to form a barrier around the wellbore which restrains the movement of sand particles into the well while offering little or no restriction to the flow of fluids, particularly oil, from the formation into the wellbore where it can be pumped to the surface of the earth.

Another very important quality of a satisfactory sand consolidation method is durability of the permeable barrier formed around the wellbore. Once the barrier is formed and the well is placed on production, there will be a substantial continuing flow of fluids through the flow channels within the permeable barrier, and it is important that the barrier last for a significant period of time, e.g. several months and preferably years, without excessive abrasive wear or other deterioration of the consolidation matrix which would allow the particulate matter to once again flow into the wellbore. This is a particularly difficult objective to accomplish in the instance of sand consolidation procedures applied to wells completed in formations subjected to steam flooding or other thermal recovery methods. The production of fluids in steam flooding operations involve higher temperatures and higher pH fluids than are normally encountered in ordinary primary production, and this greatly aggravates the stability problem of sand consolidation procedures.

It is also important that the material injected into the formation should be essentially unreactive during the period it is inside the wellbore, i.e. while it is being pumped down the well and positioned where it is desired adjacent to the perforations of the production casing. It is this desire to delay the consolidation reaction that has led to multi-step procedures in which first a catalyst is injected into the formation, after which the polymerizable resin-containing fluid is injected separately. While this reduces the propensity for the fluid to polymerize in the injection string, it does give rise to several problems which constitute inherent weaknesses in many prior art methods for accomplishing sand consolidation. First, each separate injection step increases the time and cost of the well treatment by which sand consolidation is accomplished. Second, when the only catalyst employed is injected into the formation in advance of the polymerizable fluid, uniform mixing of catalyst with all of the subsequently-injected polymerizable fluid is not achieved to the degree necessary to ensure optimum polymerization of the resin, and thus often fails to achieve maximum, uniform strength and durability of the consolidated mass.

Many materials have been utilized for consolidating sand in the formation adjacent to production of wellbores. One of the more successful agents utilized for this purpose are fluids comprising monomers or oligomers of furfuryl alcohol which can be polymerized in situ to form a solid matrix which binds the sand grains together, while at the same time offering superior resistance to high temperatures and to caustic substances which may be encountered in steam flood operations. One of the problems in utilizing furfuryl alcohol oligomers to polymerize in the formation for the purpose of consolidating sand grains is failing to achieve uniform catalysis of the polymerization. Many catalysts that are effective for polymerizing furfuryl alcohol resins cannot be admixed with the furfuryl alcohol to permit a single fluid containing both the resin and the catalyst to be injected into the formation, because the time of polymerization is so short or unpredictable that there is excessive danger that the resin will polymerize in the injection wellbore.

In U.S. Pat. No. 4,427,069 there is disclosed a procedure for consolidating sand in a formation adjacent to a wellbore using an oligomer of furfuryl alcohol, in which the catalyst used is a water soluble acidic salt, preferably zirconyl chloride, which is injected in an aqueous solution into the formation prior to injection of the resin-containing fluid. The salt absorbs on the sand grains, and sufficient acidic salt remains adsorbed on the sand grain during the subsequent resin fluid injection stage that adequate polymerization occurs. Although this has been very effective in difficult situations where sand consolidation procedures are utilized, particularly in connection with thermal flooding such as steam injection procedures, the procedure nevertheless requires a multi-fluid injection procedure which requires more time and is more expensive than is desired. Usually a preliminary sand cleaning step is required before injecting the aqueous-catalyst solution in order to remove the naturally-occurring oil film from the sand grains to ensure good catalyst adsorption on the sand. Also, although catalyst mixes with the subsequently injected polymer to a limited degree, usually sufficient to cause polymerization, it is believed that superior performance would result if the catalyst resin mixture can be made more homogenous prior to polymerization, in order to achieve a dense, strong, durable consolidation mass.

In U.S. Pat. No. 4,669,543 which issued June 2, 1987, there is described a method for consolidating sand using an acid curable resin and utilizing as a catalyst, the reaction product of an acid and an alkyl metal or ammonium molybdate. In that instance, the catalyst is incorporated in an aqueous carrier fluid which comprises the continuous phase of an emulsion in which the polymerizable resin is the dispersed or discontinuous phase. Thus this process requires that the emulsion be resolved or broken after it is located in the portion of the formation where the permeable consolidating mass is desired, which is difficult to achieve the degree of completion and accuracy of timing necessary to accomplish the desired strong durable consolidating matrix necessary for a long lasting sand consolidation process.

In our U.S. Pat. No. 4,482,072 for "SAND CONSOLIDATION METHODS" we disclosed a particularly effective method for consolidating sand utilizing a mixture of a polymerizable resin such as an oligomer of furfuryl alcohol and a diluent such as butyl acetate and an oil soluble, slightly water soluble acid catalyst such as orthonitrobenzoic acid is injected followed by injection of salt water to reestablish permeability.

In U.S. Pat. No. 4,903,770 for "SAND CONSOLIDATION" we disclosed a preferred process which is more easily removed after a period of use and which is quite inexpensive. The process employs a fluid comprising a polymerizable monomer such as furfuryl alcohol and as a diluent, a polar organic solvent such as methanol and a strong, non-volatile acid catalyst such as sulfuric acid, mixed with steam to form a multiphase or aerosol treating fluid, and injected into the formation to be consolidated. An ester such as ethyl or butyl acetate is incorporated in the fluid when the steam quality is less than 80 percent.

Both of the above methods have produced excellent results in many field applications including several viscous oil-containing formations being stimulated by steam flooding. In some applications, however, results are adversely affected by a slight shrinkage of the porous, polymerized mass which can cause cracks in the polymerized mass which causes leaks. There is a need for an inexpensive modification to the sand control treatment using monomers or oligomers of furfuryl alcohol to reduce or eliminate shrinkage of the polymerized polymer-sand mass.

SUMMARY OF THE INVENTION

Our invention concerns an improvement in methods for consolidating sand in subterranean formations penetrated by wells. The sand consolidation methods with which our improvement is utilized include those which employ a monomer or oligomer which undergoes an acid catalyzed condensation polymerization in the formation where the sand consolidation is to be achieved. In one embodiment the polymerizable monomer, preferably furfuryl alcohol, an organic diluent such as a low carbon alcohol and a nonvolatile acid catalyst are dispersed in steam forming a single multi-phase fluid comprising the steam catalyst and monomer. In another embodiment, the sand consolidation process involves the injection of an essentially liquid phase solution containing a polymerizable oligomer of furfuryl alcohol, in combination with an organic diluent such as a low carbon alcohol and a nonvolatile acid catalyst. In either of these sand consolidation methods, the polymerizable component coats the sand grains and, after passing a short distance into the formation from the well bore, polymerizes to bind these sand grains together. We have discovered that the tendency for furfuryl alcohol resins to shrink on hardening can be greatly reduced or essentially eliminated by incorporating a polymer which swells when it absorbs water, into the treating fluid containing the furfuryl alcohol monomer or oligomer, ester and acid. The preferred polymer is one which is capable of absorbing up to 1300 times its weight in water. The especially preferred polymer is a copolymer of starch and synthetic polymers (acrylamides and acrylates). The effective concentration of water swelling polymer for our application is from 0.5 to 1.5 and preferably from 0.9 to 1.1 percent by weight. This sand consolidation process may be used as a single fluid injection process which produces very good results in most applications. Occasionally, however, the presence of residual oily residue on the surface of the sand grain prevents optimum adhesion between the polymerization component of the polymerization fluids with the sand grain. Accordingly, it is desirable to inject into the formation prior to injecting the polymerization fluid, a preflush comprising a low carbon ester such as ethyl or butyl acetate prior to introducing the monomer or oligomer of furfuryl alcohol. The ester preflush removes oily residue from the sand grains and removes water from the pore spaces of the pore spaces of the portion of the formation where it is desired to accomplish sand consolidation. In one preferred embodiment, an effective amount of an acid catalyst such as sulfuric acid is incorporated in the preflush.

DETAILED DESCRIPTION OF THE PREFERRED EMBODIMENTS

Our invention concerns improvements in sand consolidation methods of the type previously disclosed by us employing polymerizable monomer or oligomer, an catalyst for the polymerization of the monomer or oligomer, and a organic diluent, and in certain embodiments, an ester such as ethyl or butyl acetate, is injected into the formation to enter the void space in the portion of the formation adjacent to the production well. In one embodiment, a liquid comprising furfuryl alcohol, alcohol diluent and acid catalyst is injected into the formation. In another embodiment, a polymerizable monomer of furfuryl alcohol is mixed with steam to form an aerosol treating fluid which is injected into the unconsolidated sand. When the steam quality is at least 80 percent, the use of ester is not essential. When the steam quality is below 70, the ester is essential to ensure adequate strength and completeness of the consolidation step.

The embodiment comprising injection of steam and polymerization chemicals is roughly analogous to a spray painting operation applied to a wire screen, where the wires are coated but the holes remain open. This method accomplishes coating the formation granular material, e.g. the formation sand, with the mixture of polymerizable monomer and catalyst. Since the reactive components of the fluid injected into the formation in this step are organic and contains a diluent, and are at steam temperatures, the minor amounts of formation petroleum and other oil-base materials coating and contaminating the surface of the sand grains are effectively removed or dissolved, making a preliminary sand cleaning step usually unnecessary. Many field applications of the above process have been applied without the use of a preliminary preflush step to remove materials coating the sand grains, with satisfactory results. There are instances, however, when the material adhering to the sand grains has a particular viscous and sticky character, and removal by the hydrocarbon component of the polymerization fluid is not sufficiently complete to ensure a uniform strong and durable sand consolidation reaction. Furthermore, the presence of substantial quantities of water in the pore spaces of the formation interferes with the condensation polymerization of furfuryl alcohol, and therefore reduces the uniformity of the reaction and consequently degrades the strength and integrity of the sand consolidation matrix itself. In these situations, a preflush of an effective solvent for the residual oil coating the sand preferably an ester which also removes water, should be used. As a general rule, the preflush should be used whenever the oil content in the treatment exceeds from 10 to 60 percent, or whenever the water content exceeds from 10 to 100 percent, or whenever prior attempts to consolidate sand in the same formation have not been entirely satisfactory.

We have found that the furfuryl alcohol monomer or oligomer used in accordance with the foregoing, polymerizes to form an effective permeable mass which permits fluid flow into the formation, restrains the flow of sand and exhibits sufficient strength and durability for most applications despite the fact that some shrinkage usually is observed during hardening or polymerization of furfuryl alcohol after it has been placed in the formation. Occasionally, however, the shrinkage of furfuryl alcohol causes problems such as formation of cracks in the consolidated sand mass around the well, which in extreme cases may lead to early failure of the sand consolidation mass.

We have found that shrinkage of furfuryl alcohol which occurs on polymerizing and curing can be greatly reduced or eliminated by incorporating a special water swelling polymer in the treating composition comprising the monomer or oligomer of furfuryl alcohol, ester and catalyst.

For our application, "swelling polymer" is intended to mean a polymeric composition which, upon contact with fresh water, will swell to hundreds of times its normal weight, desirably about 1300 times its normal weight, or more. By "normal weight" is meant the weight of the polymer in its original unswollen state.

One polymer which is suitable for use as the "swelling polymer" of this invention is SGP 5025, which is a copolymer of starch and synthetics (acrylamides and acrylates) manufactured by Henkel Corporation, Minneapolis, Minn., U.S.A. The acrylic portion of the copolymer renders it insoluble in water, yet the starch portion imparts high water affinity. Upon contact with fresh water or mildly saline water, this polymer will swell to approximately 1300 times its weight.

The concentration of swellable polymer for use in our invention is from 0.5 to 1.5 and preferably from 0.9 to 1.1 percent by weight. In this application, percent refers to the weight of the dry, unswollen polymer as a percent of the weight of the treating fluid as described herein.

Our methods are preferably accomplished using the following materials and procedures. One embodiment of our invention is employed in formations containing unconsolidated sand and heavy oil which ordinarily requires steam stimulation to achieve commercial oil recovery rates. Such formations are typically relatively shallow, e.g. seldom deeper than 2,000 feet. If it is desired to apply the methods of our invention to deeper formations, some modifications to the injection procedures may be required to avoid polymerization in the injection line.

A consolidating fluid is provided on the surface near the well. This fluid is liquid phase and comprises from 10 to 50 and preferably from 20 to 30 percent by volume of a polymerizable monomer. Furfuryl alcohol is our especially preferred polymerizable monomer because it is inexpensive, readily available, non-toxic, easily auto polymerized by acid, and forms a strong, durable polymer which withstands hostile conditions in a producing well including those associated with steam stimulation.

A diluent is used with furfuryl alcohol to reduce the reaction rate on contact with acid. Directly mixing furfuryl alcohol with acid can produce high reaction rates or even an explosion. Any polar organic diluent may be used, but low molecular weight alcohols are the preferred diluent and methanol is our especially preferred material. Non-polar solvents must not be used since uncontrolled reactions including explosions result. The consolidating fluid should contain from 90 to 50 and preferably from 80 to 70 percent by volume polar organic diluent. If an ester is used in the fluid because of low steam quality, the volume of diluent is reduced.

The acid used to catalyze the polymerization of the monomer should be non-volatile strong acid. Sulfuric acid and trichloroacetic acid are the preferred acids. The concentration of acid in the treating fluid is very critical, since the acid concentration determines the reaction rate of the polymerization. Since the reactable monomer and acid are mixed with steam on the surface, the temperature of the fluid will be known, but not easily adjustable; therefore, the acid content of the treating fluid and the concentration of monomer are the primary means for controlling the polymerization rate. It is desired that essentially little or no reaction occur in the injection string before the fluid enters the formation. Since the depth and temperature of the formation are well known and the fluid injection rate is controllable or known, it is possible to adjust the acid content of the treating fluid so polymerization occurs precisely when desired, which is shortly after the fluid enters the formation.

The following is a guideline for adjusting acid content of the treating fluid for various formation temperatures in order to cause the polymerization to occur at the desired time.

TABLE 1

Preferred Treating Fluid Acid Content for Various Temperatures

| Temperature (°F.) | Acid Content (Normality) | Time |
|---|---|---|
| 73 | 1 | 1.5 hr. |
|  | .2 | 9 hr. |
|  | .1 | 17 hr. |
|  | .05 | 32 hr. |
| 194 | 1 | 45 sec. |
|  | .2 | 4 min. |
|  | .1 | 8 min. |
|  | .05 | 14 min. |
| 300 | 1 | 6 sec. |
|  | .2 | 30 sec. |
|  | .1 | 60 sec. |
|  | .05 | 2 min. |

In addition to the above components, the treating fluid will contain from 0.5 to 1.5 and preferably from 0.9 to 1.1 percent by weight of the swelling polymers described above to reduce shrinking of furfuryl alcohol when condensation polymerization of furfuryl alcohol occurs in the formation.

Ordinarily, this fluid is injected relatively fast when using a 1 to 3 inch diameter line in the wellbore carrying treating fluid and steam where the steam generator delivers steam having quality values of from 50 to 80 percent at a pressure of from 250 to 350 pounds per square inch. Under these conditions the transit time in the injection string will be from 10 to 60 seconds.

In applying our methods, the consolidating fluid described above is mixed with steam on the surface, with the mixture passing through an injection string and into the formation where consolidation is desired. The consolidating fluid is mixed with steam in a volume ratio in the range of one part consolidating fluid to from 0.2 to 1 and preferably 0.4 to 0.6 parts by volume steam.

The mixture of consolidating fluid and steam forms a two-phase mixture, ideally an aerosol, and enters the formation in that form. The treating fluid droplets coalesce on the sand grains, forming a liquid coating on the said particles which also contain the swelling polymers. Since the dispersed drops of liquid in the aerosol treating fluid include the polymerizable monomer and the acid, the liquid film formed on the sand surface comprises both monomer and acid. As the film forms, the polymerization of monomer begins due to contact with acid and proceeds very rapidly. The vapor portion of steam maintains the void spaces between monomer-coated sand grains open, which insures that the consolidated sand mass will have sufficient permeability to allow oil flow there through later, after the coating has cured and oil production has been resumed.

The quantity of the consolidating fluid comprising the polymerizable monomer, diluent and catalyst injected into the formation varies depending on the thickness and porosity of the formation to which the sand consolidation process is to be applied, as well as the diameter of the well and the desired thickness of the permeable barrier in the formation. The thickness and porosity of the formation and the diameter of the well will always be known, and it is ordinarily satisfactory if depth of the penetration is in the range of from 6 to 12 inches from the well bore.

Since this process does not require completely filling the void space of the portion of the formation being treated with consolidating fluid, the required volume of consolidating fluid is from 10 to 30 percent of the pore space of the portion of the formation being treated. As an example, if it is desired to treat a formation whose thickness is 18 feet and porosity is 35% to form a permeable barrier just outside the perforations of the wellbore which is 8 inches thick, and the well being treated is 10 inches in diameter, then the volume of fluid necessary is calculated according to the example below.

Volume in cubic feet equals $$\frac{\pi \left(\frac{10}{2} + 8\right)^2 - \pi \left(\frac{10}{2}\right)^2}{144} \times (Ht.) \times (Porosity) \times$$

$$(0.20) = \frac{3.14(13)^2 - 3.14(5)^2}{144} \times 18 \times (.35) \times (0.20)$$

equals 3.985 cubic feet = 29.6 gallons of the consolidating fluid comprising monomer, diluent and acid. Since the consolidating fluid is mixed with steam in the ratio of 4 to 1, the total volume of treating fluid is 120 gallons.

After the steam and consolidating fluid is injected, the well should be shut in and left to stand for a period of from 1 to 24 and preferably from 2 to 9 hours to permit completion of the polymerization.

In another preferred embodiment of our invention, a substantially all liquid phase slug is used. The sand consolidation process employing the all-liquid phase sand consolidation fluid employs a polymerizable resin, preferably a derivative of furfuryl alcohol, and an oil soluble internal catalyst which can safely be mixed with the resin on the surface, so a fluid containing both catalyst and the resin is injected into the unconsolidated sand. The catalyst action is sufficiently slow at ordinary surface ambient temperatures but there is no danger of premature reaction of the resin resulting in plugging of the surface mixing equipment or the injection string utilized for pumping the resin material down the well into the formation. The catalyst activity is highly dependent on temperature, and at formation temperatures as low as 140° F., with catalyst incorporated in the resin-containing fluid, polymerization of the resin will occur in a reasonable period of time. The preferred embodiment involves preparation of a mixture of from 0.5 to 3 and preferably about 1% nitrobenzoic acid, the preferred catalyst for this reaction, and from 40 to 70%, and ideally around 50% of a polar organic diluent. Our preferred organic diluent is butyl acetate. To this mixture of butyl acetate and nitrobenzoic acid is added from 20 to 60 and preferably about 40% resin, e.g. the furfuryl alcohol oligomer. In addition, from 0.5 to 1.5 and preferably from 0.9 to 1.1 percent by weight of the swelling polymer described above is incorporated in the treating fluid to reduce shrinkage of the polymerized furfuryl alcohol mass. This homogeneous organic fluid can then be injected via the injection string into the formation without danger of premature polymerization. The injected mixture of resin, butyl acetate, nitrobenzoic acid and swelling polymer, simultaneously removes and displaces undesired oil and other material coating the sand grains, and accomplishes a thorough coating of the sand grains with the resin catalyst mixture. Next, an aqueous saline solution which is from 70% to 100% saturated with inorganic salt, preferably sodium chloride, is injected into the resin saturated zone of the formation. This injection step accomplishes an opening of flow channels within the void spaces in the formation into which the resin catalyst mixture had been injected without removing the polymerizable resin, an event which would occur with less than 70% saturated salt solution, which is important to ensure that the resulting polymerized resin bonded sand matrix is sufficiently permeable to permit flow of formation fluids from the formation after the sand consolidation process is completed. The salt water also modifies the resin coating on the sand, removing water therefrom, which increases the strength and durability of the polymerized resin matrix. The well is then shut in for a period of from 1 to 10 days and preferably at least one week. The preferred shut-in period is a function of the formation temperature. This procedure results in the formation of a permeable, durable, consolidated sand mass around the perforations of the wellbore which restrains the movement of sand into the wellbore during production operations, while permitting relatively free flow of formation fluids, particularly formation petroleum, into the wellbore. Because of the presence of swelling polymer in the resin, little or no shrinkage of the resin occurs during hardening and curing. As a result, maximum strength of the polymerized resin is achieved.

The thickness of the permeable mass formed around the perforations of the production well casing is determined by the volume of the fluid comprising the polymerizing resin and catalyst injected into the formation. Ordinarily it is sufficient for our purposes if the volume of polymerized sand is at least six inches in thickness measured from the production well perforations. If the thickness exceeds twelve inches, the barrier is still effective but is unnecessarily expensive and may be flow restricting.

EXPERIMENTAL SECTION

A series of experiments was conducted to demonstrate the effectiveness of the swelling polymer for our process. Resin was poured into each of four 10 ml graduated cylinders and allowed to harden at a temperature of 140° F. Samples 1 and 2 contained a resin mixture made of 50% Quacor 133 ® (Q.O. Chemical) and 50% by volume ethyl acetate. To this mixture 1 gram of toluene sulfonic acid per 100 mg of solution was mixed in. In samples 3 and 4 a commercial urea formaldehyde resin was used into which 2 g/100 ml of recommended catalyst were added. In addition, in samples 1 and 3 in addition was made of 1 g/100 ml of a material called Waterlon A-200 ® (Gesin Processing Co.). This latter material is what is popularly called a super slurper, a copolymer of an acrylic and starch.

All the four cylinders were filled to the 100 ml mark, capped and placed in an oven at 140° F. When the cylinders were removed from the oven after hardening, it was found that the resins containing super slurper had hardened resin filling the full 100 ml, while those without had hardened polymer cylinders which had pulled away from the sides of the container and had their tops at the 95 ml mark. Another experiment shows ½% additive was sufficient to reduce shrinkage.

FIELD EXAMPLE

For the purpose of complete disclosure, including what is now believed to be the best mode for applying the process of our invention, the following pilot field example is supplied.

A producing well is completed in a subterranean petroleum containing formation, the formation being from 2,540 to 2,588 feet. Considerable sand production has been experienced in other wells completed in this formation in the past, and so it is contemplated that some treatment must be applied in order to permit oil production from this formation without experiencing the various problems of unconsolidated sand production. This particular well has not been used for oil production, and so little sand has been produced from the formation. It is known that the sand is coated with viscous formation crude, but is otherwise of a reasonable particle size to accommodate sand consolidation process using the natural sand present in the formation. Because of the viscous oil residue on the sand grains, and a significant water saturation in the formation where the consolidation is to be conducted, (in the order of about 8%), it is felt that satisfactory sand consolidation results can only be achieved if a preflush is applied to the formation prior to the injection of the polymerizable alcohol.

It is desired to inject sufficient preflush to fill the pore space of a cylindrical portion of the formation adjacent to the wellbore face and extending twelve inches into the formation. The wellbore diameter is ten inches and the porosity is 40 percent. The volume of preflush required is:

$$\frac{3.14\left(\frac{10}{2} + 12\right)^2 - 3.14\left(\frac{10}{2}\right)^2}{144} \times (0.40)(48) =$$

$$\frac{3.14(17)^2 - 3.14(5)^2}{144} \times (.40)(48) = 110.53 \text{ Cu.Ft. or 826 gallons}$$

For this purpose, a quantity of 826 gallons of ethyl acetate containing 8.26 gallons sulfuric acid is employed. The ethyl acetate is injected directly into the steam line to pass directly into the portion of the formation with which the injection means connect. The sand consolidation mixture is injected immediately after the completion of injection of the ethyl acetate preflush, since there is no reaction between the two fluids. It is determined that it is sufficient to treat approximately 12 inches into the formation. Based on experience in this field, it is expected that the porosity of the formation to be treated is approximately 40%. The outside casing diameter of the well being treated is ten inches. The volume of sand consolidating fluid necessary to treat this portion of formation is determined as follows:

$$3.14\left(\frac{10}{2}+12\right)^2 - 3.14\left(\frac{10}{2}\right)^2 \over 144 \times (0.40)(48)(0.20) =$$

$$\frac{3.14(17)^2 - 3.14(5)^2}{144} \times (.40)(48)(0.20) =$$

22.12 Cu.Ft. or 165.5 gallons

In order to accomplish adequate contact of the portion of the unconsolidated sand formation adjacent to the production well, a total of 166 gallons of sand consolidating fluid is required. The required volume of sand consolidation treating fluid is formulated by mixing 45 gallons of furfuryl alcohol with 119.0 gallons of methanol to which had previously been added 2.0 gallons of sulfuric acid. To this is added 1.6 gallons of Waterlon A-200, a swelling polymer as defined herein. The preflush fluid is introduced into the steam line and injected at a ratio of 80 parts steam to 10 parts preflush. Next and without using any isolation slug, the sand consolidation fluid is injected into a steam line at the wellhead in a ratio of 90 parts steam to 10 parts sand consolidating fluid. Steam temperature is 300° F. and the steam quality is 85 percent. This sand consolidating fluid is injected into the formation at a rate of about 1,440 gallons per hour. After the preflush and all of the treating fluid has been injected into the formation, the well is shut in for 6 hours to ensure complete polymerization. At the conclusion of this shut-in period, the well is placed on production and essentially sand-free oil production is obtained. No shrinkage of the polymerized furfuryl alcohol has occurred.

Although our invention has been described in terms of a series of specific preferred embodiments and illustrative examples which applicants believe to include the best mode for applying their invention known to them at the time of this application, it will be recognized to those skilled in the art that various modifications may be made to the composition and methods described herein without departing from the true spirit and scope of our invention which is defined more precisely in the claims appended hereinafter below.

We claim:

1. A method for consolidating unconsolidated mineral particles including sand in a subterranean petroleum formation penetrated by a well in fluid communication with at least a portion of the formation, comprising:
   introducing a sand consolidating fluid into the formation, said sand consolidating fluid containing a polymerizable compound comprising a monomer or oligomer, a diluent for the polymerizable compound, an acid catalyst capable of causing condensation polymerization of the polymerizable compound at fluid injection temperatures and an effective amount of swelling polymer which reduces shrinkage of the polymerizable compound during polymerization; and
   allowing the injection fluid to remain in the formation for a period of time sufficient to accomplish at least partial polymerization of the polymerizable compound, forming a permeable consolidated mass around the wellbore.

2. A method as recited in claim 1 wherein the polymerizable compound is mixed with steam to form a multiphase treating fluid to be injected into the formation.

3. A method as recited in claim 1 wherein the polymerizable compound and diluent are injected as a single liquid phase treating fluid.

4. A method as recited in claim 1, wherein the swelling polymer is a polymeric composition which upon contact with fresh water will swell to 1300 times its normal weight.

5. A method as recited in claim 4 wherein the polymer is a copolymer of starch and a synthetic polymer.

6. A method as recited in claim 5 wherein the polymer is a copolymer of starch and a synthetic polymer selected from the group consisting of acrylamides, acrylates and mixtures thereof.

7. A method as recited in claim 1 wherein the concentration of swelling polymer is from 0.5 to 1.5 percent of the treating fluid.

8. A method as recited in claim 1 wherein the concentration of swelling polymer is from 0.9 to 1.1 percent of the treating fluid.

* * * * *